United States Patent
Yanagihara

(10) Patent No.: US 11,549,893 B2
(45) Date of Patent: Jan. 10, 2023

(54) PROJECTOR

(71) Applicant: SEIKO EPSON CORPORATION, Tokyo (JP)

(72) Inventor: Hirokazu Yanagihara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 17/131,125

(22) Filed: Dec. 22, 2020

(65) Prior Publication Data

US 2021/0199595 A1 Jul. 1, 2021

(30) Foreign Application Priority Data

Dec. 26, 2019 (JP) .............................. JP2019-235883

(51) Int. Cl.
| | | |
|---|---|---|
| *G01N 21/94* | (2006.01) | |
| *G01J 5/34* | (2022.01) | |
| *G01J 5/00* | (2022.01) | |

(52) U.S. Cl.
CPC ............ *G01N 21/94* (2013.01); *G01J 5/0025* (2013.01); *G01J 5/34* (2013.01)

(58) Field of Classification Search
CPC ........... G01N 21/94; G01J 5/0025; G01J 5/34
See application file for complete search history.

(56) References Cited

U.S. PATENT DOCUMENTS

2009/0147224 A1* 6/2009 Kurozuka .......... G03B 21/2033
  353/98
2015/0241763 A1 8/2015 Nishi et al.

FOREIGN PATENT DOCUMENTS

| JP | 2011-257644 A | 12/2011 |
| JP | 2014-191014 A | 10/2014 |
| JP | 2015-158561 A | 9/2015 |
| JP | 2018-4951 A | 1/2018 |
| JP | 2018-22191 A | 2/2018 |

* cited by examiner

*Primary Examiner* — David P Porta
*Assistant Examiner* — Fani Polyzos Boosalis
(74) *Attorney, Agent, or Firm* — Dority & Manning, P.A.

(57) ABSTRACT

A projector includes a first detection section which has a first sensor provided to an enclosure, and has a first detection axis as a central axis of a first detection range as a detection range of the first sensor, and a second detection section which has a second sensor provided to the enclosure, and has a second detection axis as a central axis of a second detection range as a detection range of the second sensor, and a distance of the first detection range from the first sensor in the first detection axis of the first detection section is longer than a distance of the second detection range from the second sensor in the second detection axis of the second detection section.

10 Claims, 6 Drawing Sheets

PROJECTOR

The present application is based on, and claims priority from JP Application Serial Number 2019-235883, filed Dec. 26, 2019, the disclosure of which is hereby incorporated by reference herein in its entirety.

BACKGROUND

1. Technical Field

The present disclosure relates to a projector.

2. Related Art

In the past, there has been known a projector provided with an illuminance detection section having an illuminance sensor, a foreign matter detection section having a foreign matter detection sensor, and a control section (see, e.g., JP-A-2014-191014 (Document 1)).

In the projector described in Document 1, the illuminance sensor detects the luminance in the periphery of the projector. The foreign matter detection sensor is disposed in the vicinity of the illuminance sensor to detect a foreign matter in the outside of an enclosure. In particular, the foreign matter detection sensor detects the presence of a foreign matter in the periphery of the illuminance sensor. The control section controls an image projection section for forming and projecting an image so as to be able to project a projection image having optimum illuminance in accordance with the ambient luminance detected by the illuminance detection section. Further, when a foreign matter has been detected by the foreign matter detection section in the periphery of the illuminance sensor, the control section makes a notification unit notify the user of the presence of the foreign matter.

In the projector described in Document 1, the orientation of a detection axis of the foreign matter detection sensor is the same as the orientation of a detection axis of the illuminance sensor, and the foreign matter detection sensor is disposed in the vicinity of the illuminance sensor. In other words, in the projector described in Document 1, the detection range of the illuminance sensor and the detection range of the foreign matter detection sensor are virtually identical to each other. Therefore, even when providing a sensor for detecting an object different from a detection object of the foreign matter detection sensor instead of the illuminance sensor, there is a problem that an object within the same detection range can only be detected by the sensor provided instead of the illuminance sensor, and the foreign matter detection sensor.

SUMMARY

A projector according to an aspect of the present disclosure includes an illumination section configured to emit light, a light modulation section configured to modulate the light from the illumination section in accordance with image information, a projection section configured to project the light from the light modulation section, an enclosure configured to house the illumination section, the light modulation section, and the projection section, a first detection section which has a first sensor provided to the enclosure, and is configured to detect a presence of a first object in an outside of the enclosure, and a second detection section which has a second sensor provided to the enclosure, and is configured to detect a presence of a second object different from the first object in the outside of the enclosure, wherein when defining a central axis of a first detection range, which is a detection range of the first sensor, as a first detection axis, and a central axis of a second detection range, which is a detection range of the second sensor, as a second detection axis, a distance from an end part in a direction along the first detection axis in the first detection range to the first sensor is longer than a distance from an end part in a direction along the second detection axis in the second detection range to the second sensor.

DESCRIPTION OF AN EXEMPLARY EMBODIMENT

An embodiment of the present disclosure will hereinafter be described based on the drawings.

Schematic Configuration of Projector

Figure 1:
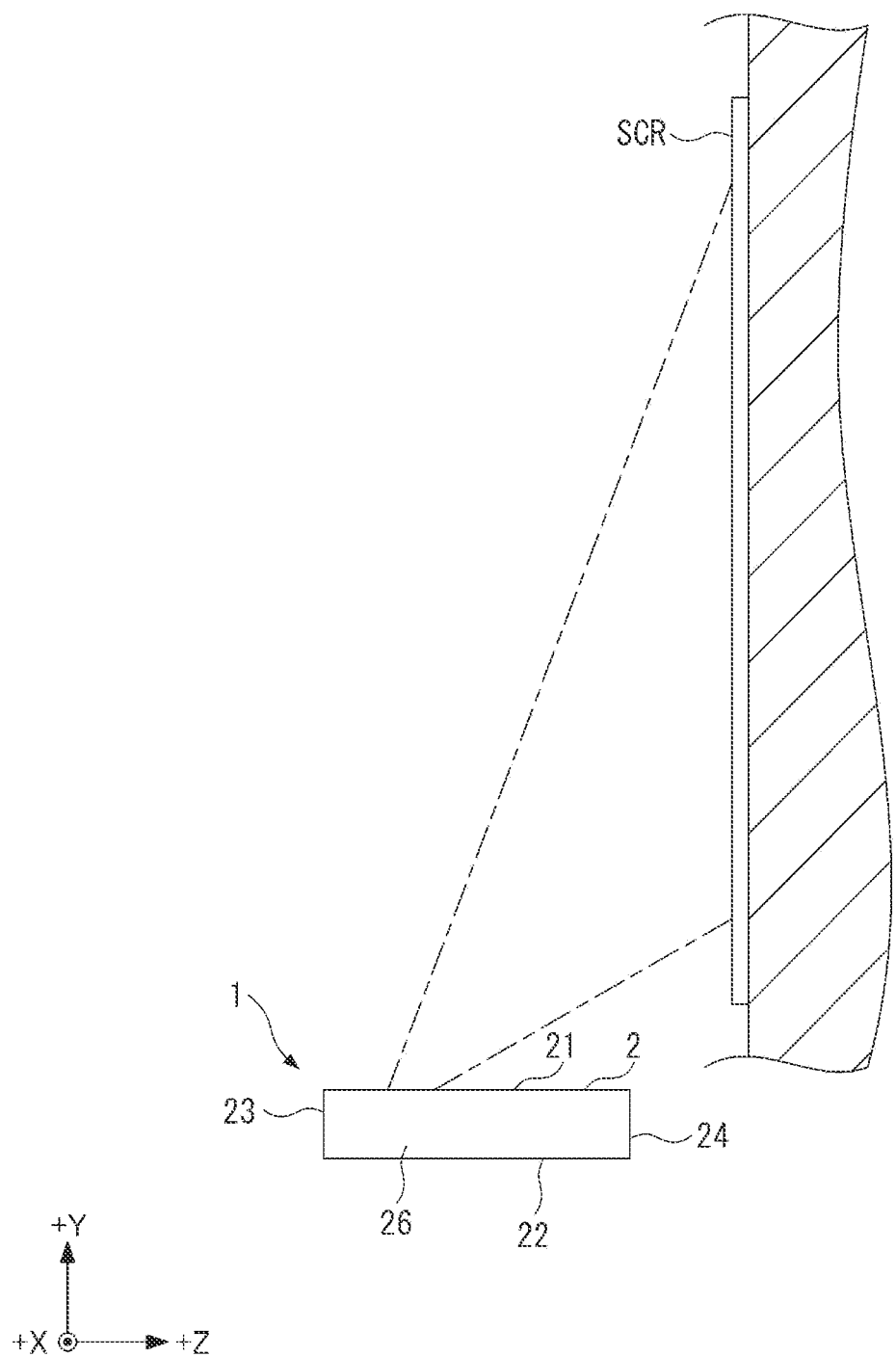
FIG. 1 is a diagram for explaining the usage state of a projector in an embodiment.

FIG. 1 is a diagram for explaining the usage state of a projector 1 in the present embodiment.

As shown in FIG. 1, the projector 1 is an image display device which modulates the light emitted from a light source to form an image corresponding to image information, and then projects the image thus formed to a screen SCR as a projection target surface in an enlarged manner. The projector 1 is a projector which is installed on the floor or a table to be used, and is a so-called short focus projector short in the projection distance of the light recognized as an image.

Figure 2:
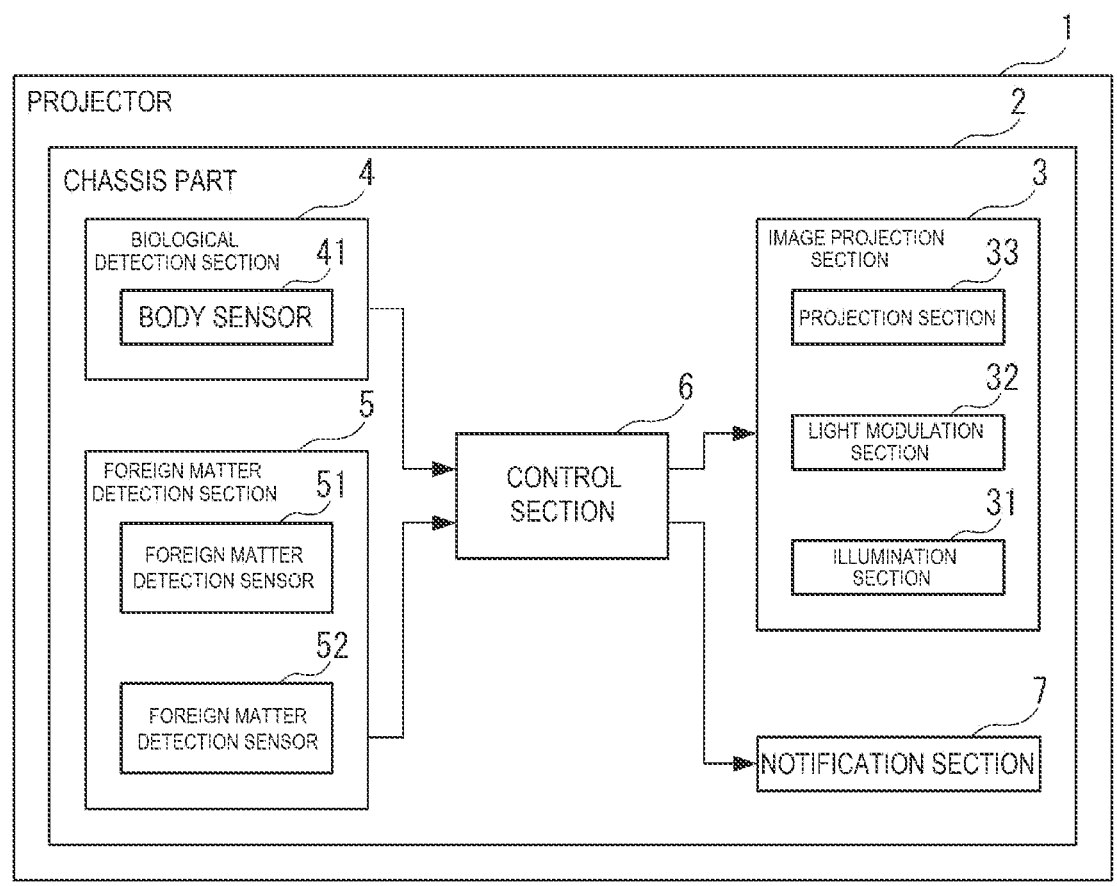
FIG. 2 is a block diagram showing a configuration of the projector in the embodiment.

FIG. 2 is a block diagram showing a configuration of the projector 1. The arrows in FIG. 2 schematically represent the flow of information inside the projector 1.

As shown in FIG. 2, the projector 1 is provided with an enclosure 2, an image projection section 3, a biological detection section 4, a foreign matter detection section 5, a control section 6, and a notification section 7.

It should be noted that a configuration of the enclosure 2 will be described later in detail.

Configuration of Image Projection Section

The image projection section 3 forms an image corresponding to image information, and then projects the image thus formed under the control by the control section 6. The image projection section 3 has an illumination section 31, a light modulation section 32, and a projection section 33.

Although not shown in the drawings, the illumination section 31 has a light source for emitting the light to illuminate the light modulation section 32. As the light source, there can be cited a discharge light source lamp such as a super-high pressure mercury lamp, a solid-state light source such as an LED (Light Emitting Diode) and an LD (Laser Diode), and a self-luminous element such as an organic EL (Electro-Luminescence).

The light modulation section 32 is provided with a light modulation device for modulating the light from the illumination section 31 in accordance with the image information. As the light modulation device, there can be illustrated a variety of types of light modulation devices such as a liquid crystal type light modulation device and a micromirror type light modulation device.

The projection section 33 projects the light modulated by the light modulation section 32 to the screen SCR as the projection light to thereby display the image formed by the light modulation section 32. Although not shown in the drawings, the projection section 33 has a plurality of optical lenses or a single optical lens, an optical mirror for reflecting the light emitted from the optical lens, and a holding chassis for holding the optical lenses or the optical lens and the optical mirror.

It should be noted that the image projection section 3 can also have a homogenization section for homogenizing the light entering the homogenization section from the illumination section 31, a light separation section for separating the light entering the light separation section from the homogenization section into a plurality of colored light beams, a light guide section for guiding the colored light beams thus separated, and so on besides the illumination section 31, the light modulation section 32, and the projection section 33.

As the homogenization section, there can be cited, for example, a configuration including a lens integrator optical system or a rod integrator optical system. As the light separation section, there can be cited, for example, what is obtained by combining a plurality of dichroic mirrors. As the light guide section, there can be cited, for example, what is obtained by combining an optical lens and an optical mirror for guiding the light.

Configuration of Enclosure

Figure 3:
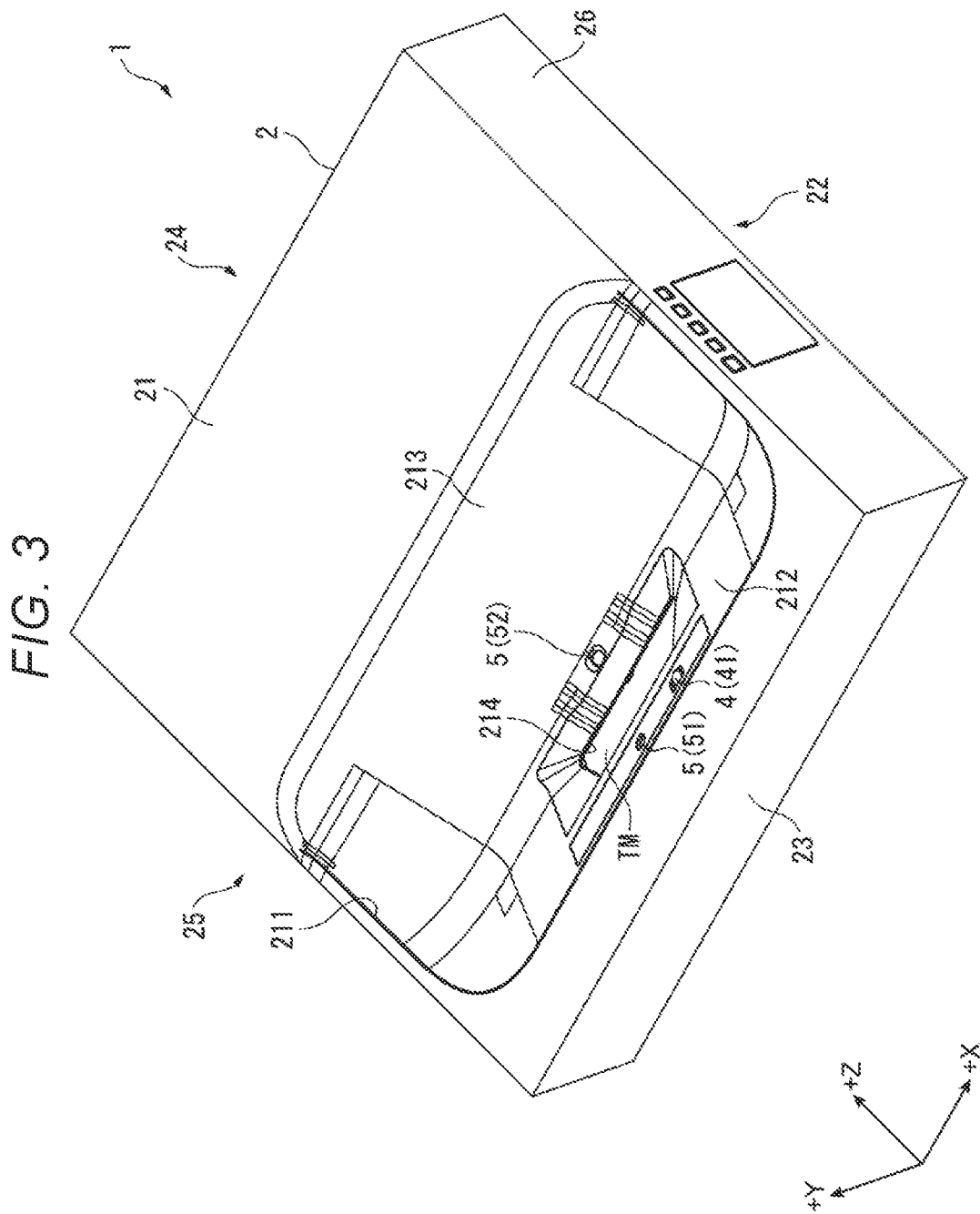
FIG. 3 is a perspective view showing the projector in the embodiment.
Figure 4:
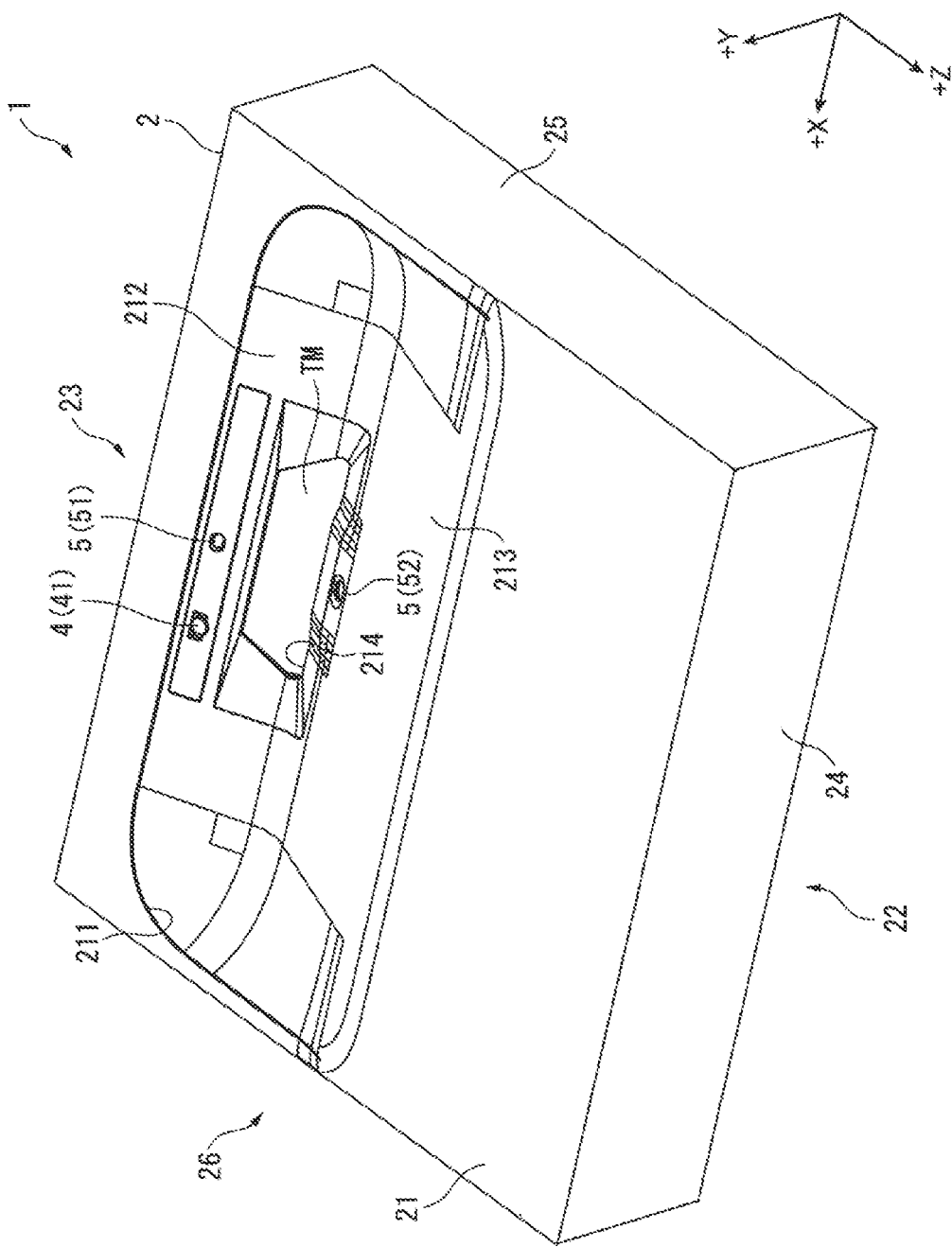
FIG. 4 is a perspective view showing the projector in the embodiment.

FIG. 3 and FIG. 4 are each a perspective view showing the projector 1. In particular, FIG. 3 is a perspective view showing the projector 1 viewed from a front surface part 23 side. FIG. 4 is a perspective view showing the projector 1 viewed from a back surface part 24 side.

The enclosure 2 houses the image projection section 3, the biological detection section 4, the foreign matter detection section 5, the control section 6, and the notification section 7 to form an exterior of the projector 1. The enclosure 2 has a top surface part 21, a bottom surface part 22, the front surface part 23, the back surface part 24, a left side surface part 25, and a right side surface part 26.

The top surface part 21 and the bottom surface part 22 are regions forming opposite sides to each other, and the front surface part 23 and the back surface part 24 are regions forming opposite sides to each other. The same applies to the left side surface part 25 and the right side surface part 26. In the usage state of the projector 1 shown in FIG. 1, the top surface part 21 faces upward, and the back surface part 24 is opposed to the screen SCR or a sidewall to which the screen SCR is installed.

The top surface part 21 corresponds to a first surface. The top surface part 21 has a recessed part 211 and a passage opening 214.

The recessed part 211 is formed so as to be recessed toward the bottom surface part 22. The recessed part 211 has a first tilted part 212 and a second tilted part 213 opposed to each other.

The first tilted part 212 forms a region near the front surface part 23 in the recessed part 211. The first tilted part 212 is tilted from a region near the front surface part 23 in the top surface part 21 so as to come closer to the bottom surface part 22 in a direction toward the back surface part 24.

The second tilted part 213 forms a region near the back surface part 24 in the recessed part 211. The second tilted part 213 is tilted from a region near the back surface part 24 in the first tilted part 212 so as to get away from the bottom surface part 22 in a direction toward the back surface part 24.

The passage opening 214 is located in the first tilted part 212. The passage opening 214 is an opening part through which the image projected by the projection section 33 passes. The passage opening 214 is closed by a light transmissive member TM for transmitting the visible light. It should be noted that the reason that the second tilted part 213 is disposed contiguously to the first tilted part 212 in which the passage opening 214 is located is to prevent the light emitted from the passage opening 214 from being blocked by the top surface part 21.

Although described later in detail, in such a top surface part 21, there are disposed a body sensor 41 of the biological detection section 4 and foreign matter detection sensors 51, 52 of the foreign matter detection section 5.

Figure 6:
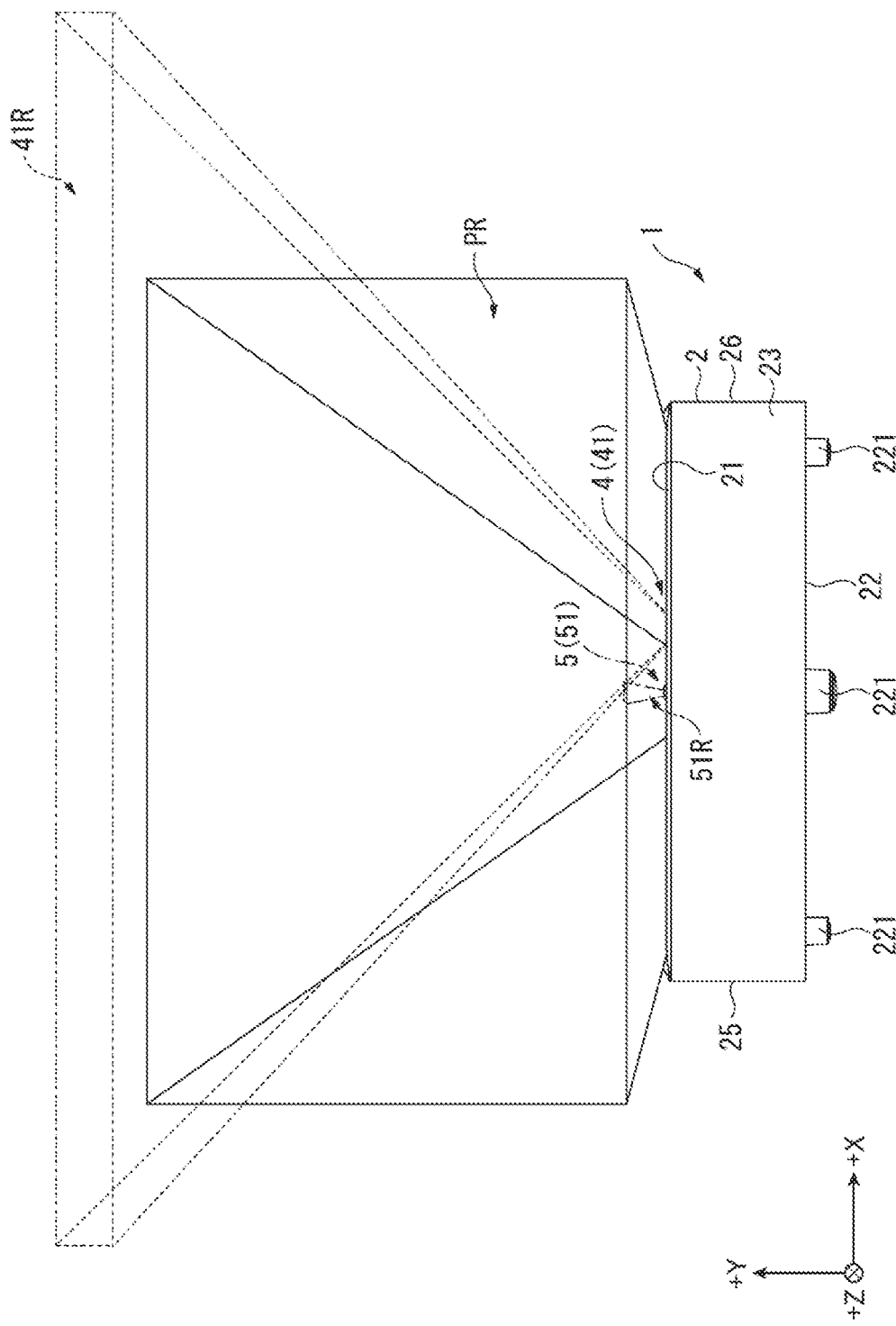
FIG. 6 is a diagram showing an example of the detection ranges of the body sensor and the foreign matter detection sensors and the projection range of the light in the embodiment.

It should be noted that although not shown in FIG. 3 and FIG. 4, the bottom surface part 22 is provided with a plurality of leg parts 221 (see FIG. 6). The plurality of leg parts 221 has contact with an installation surface to which the projector 1 is installed.

In the following description, three directions perpendicular to each other are defined as a +X direction, a +Y direction, and a +Z direction. In the present embodiment, it is assumed that the +X direction is a direction from the left side surface part 25 toward the right side surface part 26, the +Y direction is a direction from the bottom surface part 22 toward the top surface part 21, and the +Z direction is a direction from the front surface part 23 toward the back surface part 24. Although not shown in the drawings, an opposite direction to the +X direction is defined as a −X direction, an opposite direction to the +Y direction is defined as a −Y direction, and an opposite direction to the +Z direction is defined as a −Z direction.

Configuration of Biological Detection Section

The biological detection section 4 is for detecting the presence of a human as a first object in the outside of the enclosure 2, and corresponds to a first detection section. For example, the biological detection section 4 detects the presence of a human trying to peer into the passage opening 214. As shown in FIG. 2, the biological detection section 4 has the body sensor 41 for detecting the presence of a human, and outputs the detection result by the body sensor 41 to the control section 6.

The body sensor 41 corresponds to a first sensor. The body sensor 41 is formed of a pyroelectric sensor for detecting middle infrared as heat radiated from a living body using a pyroelectric effect within a predetermined detection range. For example, when a human enters the detection range, the middle infrared ray radiated from the body is detected by the body sensor 41, and thus, it is detected that the human is present within the detection range.

The body sensor 41 is disposed at a position which is not affected by the projection light by the image projection section 3, namely a position which the projection light does not enter. Specifically, the body sensor 41 is disposed at a position shifted along the +X direction from the center in the +X direction of the first tilted part 212 as shown in FIG. 3 and FIG. 4.

It should be noted that the detection range by the body sensor 41 will be described later in detail.

Configuration of Foreign Matter Detection Section

The foreign matter detection section 5 is for detecting the presence of a foreign matter as a second object located outside the enclosure 2, and corresponds to a second detection section. For example, the foreign matter detection section 5 detects the presence of a foreign matter which covers at least a part of the passage opening 214. As shown in FIG. 2, the foreign matter detection section 5 has the plurality of foreign matter detection sensors 51, 52 for detecting the presence of a foreign matter, and outputs the detection result by the foreign matter detection sensors 51, 52 to the control section 6. The foreign matter detection sensors 51, 52 each correspond to a second sensor.

As shown in FIG. 3 and FIG. 4, the foreign matter detection sensor 51 is located in the first tilted part 212, and the foreign matter detection sensor 52 is located in the second tilted part 213. In particular, the foreign matter detection sensor 51 is disposed at a position shifted toward the −Z direction from the passage opening 214 on an imaginary line parallel to the −Z direction and passing through the center of the passage opening 214 in the first tilted part 21. The foreign matter detection sensor 52 is disposed at a position shifted toward the +Z direction from the passage opening 214 on the imaginary line described above in the second tilted part 213. In other words, the foreign matter detection sensors 51, 52 are disposed at the positions across the passage opening 214. In other words, the foreign matter detection sensor 52 is disposed at the opposite side to the foreign matter detection sensor 51 across the passage opening 214.

The foreign matter detection sensors 51, 52 are each formed of an infrared sensor. In other words, although not shown in the drawings, the foreign matter detection sensors 51, 52 each have a light emitting section for emitting the infrared ray and a light receiving section for receiving the infrared ray reflected by the object.

When no foreign matter exists within the detection range of the foreign matter detection sensor 51, the detection light emitted from the light emitting section of the foreign matter detection sensor 51 does not enter the light receiving section of the foreign matter detection sensor 51. In contrast, when a foreign matter exists within the detection range, at least a part of the detection light emitted from the light emitting section of the foreign matter detection sensor 51 is reflected by the foreign matter to enter the light receiving section of the foreign matter detection sensor 51. The same applies to the foreign matter detection sensor 52.

As described above, the foreign matter detection sensors 51, 52 each detect whether or not a foreign matter exists outside the enclosure 2, for example, at the position where the foreign matter covers the passage opening 214 based on whether or not the detection light emitted from the light emitting section enters the light receiving section. It should be noted that the foreign matter detection sensors 51, 52 can each be arranged to detect not only whether or not a foreign matter exists, but also the distance to the foreign matter and the size of the foreign matter.

The detection ranges by such foreign matter detection sensors 51, 52 will be described later in detail.

Configuration of Control Section

The control section 6 has an arithmetic processing circuit to control operations of the projector 1. For example, the control section 6 processes the image information input to the projector 1 from the outside, and then outputs the image information thus processed to the light modulation section 32. Further, the control section 6 controls the illumination section 31. Specifically, the control section 6 adjusts the amount of the light output from the illumination section 31 in accordance with an operation mode and so on set by the user. Further, when the presence of a human has been detected by the biological detection section 4, the presence of a foreign matter has been detected by the foreign matter detection section 5, or both of the presence of a human and the presence of a foreign matter have respectively been detected by the biological detection section 4 and the foreign matter detection section 5, the control section 6 puts the illumination section 31 off, and in addition, gives notice of the presence of the human, the presence of the foreign matter, or the presence of the human and the foreign matter with the notification section 7 described later.

Configuration of Notification Section

The notification section 7 has an indicator which includes a solid-state light source such as an LED, and is installed to an outer surface of the enclosure 2. When, for example, the presence of a human has been detected by the biological detection section 4, the notification section 7 blinks in a first color as a predetermined color under the control by the control section 6. When, for example, the presence of a foreign matter has been detected by the foreign matter detection section 5, the notification section 7 blinks in a second color different from the first color under the control by the control section 6. When, for example, the projector 1 can normally operate, the notification section 7 blinks in a third color different from the first color and the second color under the control by the control section 6.

It should be noted that it is possible for the notification section 7 to have a sound output section for generating sounds different from each other between when the presence of a human has been detected and when the presence of a foreign matter has been detected. Further, it is possible for the notification section 7 to give notice of the presence of a human or the presence of a foreign matter with an image projection section different from the image projection section 3 when the presence of the human or the presence of the foreign matter has been detected. In other words, the configuration of the notification section 7 does not matter as long as the user can be notified of the presence of a human or a foreign matter.

Detection Direction of Body Sensor

Figure 5:
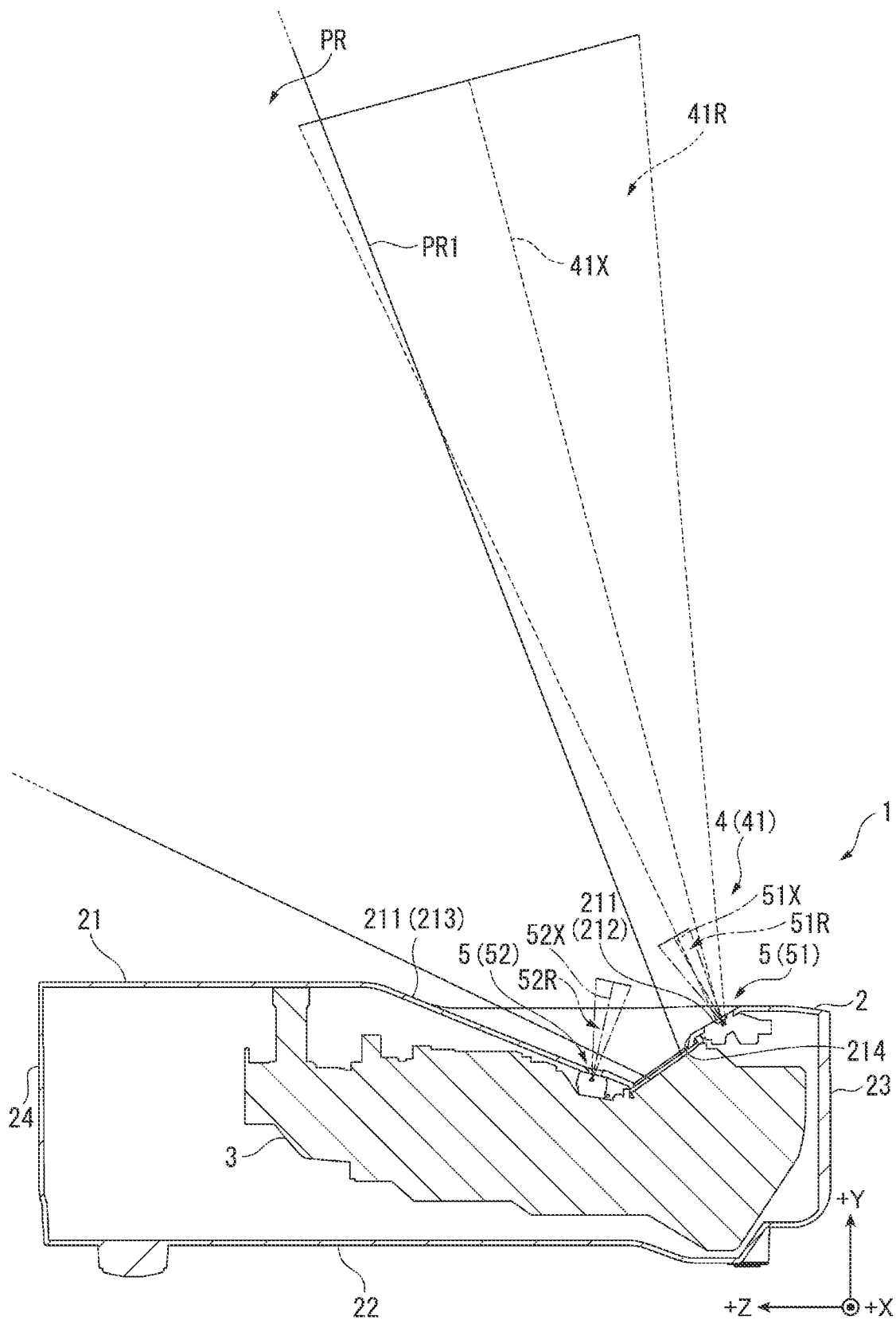
FIG. 5 is a diagram showing an example of detection ranges of a body sensor and foreign matter detection sensors and a projection range of light in the embodiment.

FIG. 5 is a diagram showing an example of a detection range 41R of the body sensor 41, detection ranges 51R, 52R of the foreign matter detection sensors 51, 52, and a projection range PR of the light by the image projection section 3 when viewing the projector 1 from a position opposed to the left side surface part 25. In FIG. 5, the detection range 41R is represented by the dotted lines, the detection ranges 51R, 52R of the foreign matter detection sensors 51, 52 are represented by the dashed-dotted lines, and the projection range PR of the light by the image projection section 3 is represented by the solid lines.

As described above, for example, the body sensor 41 detects the presence of a human trying to peer into the passage opening 214. Therefore, the body sensor 41 is disposed in the first tilted part 212 of the top surface part 21 so that the detection direction of the body sensor 41 points to the projection side of the light by the image projection section 3, and the detection direction is set along the projection direction of the light by the image projection section 3. Specifically, as shown in FIG. 5, the projection direction of the light by the image projection section 3 includes a +Z direction component and the +Y direction component on the one hand, and the detection direction of the body sensor 41 includes a +Z direction component and the +Y direction component on the other hand. In other words, defining the central axis of the detection range 41R of the body sensor 41 as a detection axis 41X, the detection axis 41X extends from the body sensor 41 toward the +Z direction and the +Y direction along the projection direction of the light by the projection section 33. The detection range 41R corresponds to a first detection range, and the detection axis 41X corresponds to a first detection axis.

It should be noted that the light which passes through the center of the projection range PR in the +X direction, and is emitted toward a direction the most approximate to the +Y direction in the projection range PR of the light by the image projection section 3 is defined as light PR1. In this case, the state in which the detection axis 41X of the body sensor 41 is set along the projection direction of the light by the projection section 33 means the state in which, for example, the crossing angle between an axis parallel to the proceeding direction of the light PR1 and the detection axis 41X becomes equal to or smaller than 20°, and the state in which the end edge approximate to the +Y direction in the detection range 41R is located more approximate to the +Y direction than the end edge approximate to the +Y direction in the projection range PR.

Detection Direction of Foreign Matter Detection Sensor

The foreign matter detection sensor 51 is disposed so that the detection direction of the foreign matter detection sensor 51 points to the passage opening 214. The foreign matter detection sensor 52 is arranged so that the detection direction of the foreign matter detection sensor 52 points to the passage opening 214. Specifically, as shown in FIG. 5, the detection direction of the foreign matter detection sensor 51 includes the +Z direction component and the +Y direction component, and the detection direction of the foreign matter detection sensor 52 includes the −Z direction component and the +Y direction component. In other words, defining the central axis of the detection range 51R of the foreign matter detection sensor 51 provided to the first tilted part 212 as a detection axis 51X, the detection axis 51X extends from the foreign matter detection sensor 51 toward the +Z direction and the +Y direction. Further, defining the central axis of the detection range 52R of the foreign matter detection sensor 52 provided to the second tilted part 213 as a detection axis 52X, the detection axis 52X extends from the foreign matter detection sensor 52 toward the −Z direction and the +Y direction.

It should be noted that the detection ranges 51R, 52R are set so that the detection light emitted from the light emitting section of the foreign matter detection sensor 51 is not received by the light receiving section of the foreign matter detection sensor 52, and further, the detection light emitted from the light emitting section of the foreign matter detection sensor 52 is not received by the light receiving section of the foreign matter detection sensor 51.

Detection Limits of Body Sensor and Foreign Matter Detection Sensor

It is sufficient for the foreign matter detection sensors 51, 52 to be able to detect the presence of a foreign matter which, for example, blocks at least a part of the passage opening 214. Therefore, the distance from the foreign matter detection sensor 51 to the end part in a direction along the detection axis 51X in the detection range 51R can relatively be short. Similarly, the distance from the foreign matter detection sensor 52 to the end part in a direction along the detection axis 52X in the detection range 52R can relatively be short.

In contrast, it is necessary for the body sensor 41 to detect the presence of a human trying to peer into the passage opening 214 of the projector 1 installed on the installation surface such as the floor or a table. Therefore, it is preferable for the distance from the body sensor 41 to the end part in a direction along the detection axis 41X in the detection range 41R to relatively be long.

Therefore, the distance from the end part in the direction along the detection axis 41X in the detection range 41R to the body sensor 41 is longer than the distance from the end part in the direction along the detection axis 51X in the detection range 51R to the foreign matter detection sensor 51. Further, the distance from the end part in the direction along the detection axis 41X in the detection range 41R to the body sensor 41 is longer than the distance from the end part in the direction along the detection axis 52X in the detection range 52R to the foreign matter detection sensor 52. In other words, the distance between the body sensor 41 and the end part in the direction along the detection axis 41X in the detection range 41R is longer than the distance between the foreign matter detection sensor 51 and the end part in the direction along the detection axis 51X in the detection range 51R. Further, the distance between the body sensor 41 and the end part in the direction along the detection axis 41X in the detection range 41R is longer than the distance between the foreign matter detection sensor 52 and the end part in the direction along the detection axis 52X in the detection range 52R. In other words, a maximum detection distance of the body sensor 41 is longer than a maximum detection distance of each of the foreign matter detection sensors 51, 52. It should be noted that the maximum detection distance means a maximum distance from a sensor when the sensor can detect the detection object.

Detection Range of Body Sensor

FIG. 6 is a diagram showing an example of the detection range 41R of the body sensor 41, the detection range 51R of the foreign matter detection sensor 51 and the projection range PR of the light by the image projection section 3 when viewing the projector 1 from a position opposed to the front surface part 23. It should be noted that also in FIG. 6, the detection range 41R is represented by the dotted lines, the detection range 51R is represented by the dashed-dotted lines, and the projection range PR is represented by the solid lines.

As shown in FIG. 5 and FIG. 6, the detection range 41R of the body sensor 41 is set so as to be located outside the projection range PR of the light by the image projection section 3 in a range in which the presence of a human can be detected by the body sensor 41. In particular, the detection range 41R of the body sensor 41 is set so as to be more approximate to the +Y direction than the projection range PR of the light in the detectable range. Further, the detection range 41R of the body sensor 41 in the +X direction is larger than the projection range PR in the +X direction in the detectable range. In other words, in the detectable range, an area in the +X direction side in the detection range 41R is located so as to be shifted toward the +X direction from the projection range PR, and an area in the −X direction side in the detection range 41R is located so as to be shifted toward the −X direction from the projection range PR.

As one of the reasons that the detection range 41R of the body sensor 41 is set in such a manner, the following reason can be cited.

As shown in FIG. 1, the projector 1 as the short focus projector can be installed at a position which is shifted toward the −Y direction from the screen SCR, and is relatively near to the screen SCR. When the projector 1 is arranged in such a manner, there is a possibility that a human tries to peer into the passage opening 214 from the front surface part 23 side.

In contrast, in the projector 1, by disposing the body sensor 41 so as to be shifted toward the −Z direction from the passage opening 214 to set the detection range 41R in such a manner as described above, it is possible for the body sensor 41 to detect the presence of a human trying to peer into the passage opening 214. In other words, the detection range 41R is set so as to be shifted toward the +Y direction or the −Z direction from the projection range PR so that the body sensor 41 can detect the presence of a human trying to enter the projection range PR from the front surface part 23 side.

It should be noted that in the present embodiment, the detection range 41R is not set at a position shifted toward the −Y direction from the end part in the +Y direction in the projection range PR. This is because the distance between the projector 1 and the screen SCR is short, and therefore, it is difficult for a human to peer into the passage opening 214 from the position shifted toward the ±X directions or the −Y direction from the projector 1. However, it is possible for the detection range 41R to include the positions shifted toward the −Y direction from the end part in the +Y direction in the projection range PR.

Advantages of Embodiment

The projector 1 according to the present embodiment described hereinabove has the following advantages.

The projector 1 is provided with the illumination section 31, the light modulation section 32, the projection section 33, the enclosure 2, the biological detection section 4 as the first detection section, and the foreign matter detection section 5 as the second detection section.

The illumination section 31 emits the light. The light modulation section 32 modulates the light from the illumination section 31 in accordance with the image information. The projection section 33 projects the light from the light modulation section 32. The enclosure 2 houses the illumination section 31, the light modulation section 32, and the projection section 33. The biological detection section 4 has the body sensor 41 as the first sensor provided to the enclosure 2. The biological detection section 4 detects the presence of a human as a first object in the outside of the enclosure 2. The foreign matter detection section 5 has the foreign matter detection sensors 51, 52 as the second sensors provided to the enclosure 2. The foreign matter detection section 5 detects the presence of a foreign matter as a second object different from the first object in the outside of the enclosure 2.

The central axis of the detection range 41R (the first detection range) of the body sensor 41 is defined as the detection axis 41X, and the central axes of the detection ranges 51R, 52R (second detection ranges) of the foreign matter detection sensors 51, 52 are defined as the detection axes 51X, 52X, respectively. The detection axis 41X corresponds to the first detection axis, and the detection axes 51X, 52X each correspond to a second detection axis. The distance from the body sensor 41 to the end part in the direction along the detection axis 41X in the detection range 41R is longer than the distance from the foreign matter detection sensor 51 to the end part in the direction along the detection axis 51X in the detection range 51R. Further, the distance from the end part in the direction along the detection axis 41X in the detection range 41R to the body sensor 41 is longer than the distance from the end part in the direction along the detection axis 52X in the detection range 52R to the foreign matter detection sensor 52.

According to such a configuration, the detection range 41R of the body sensor 41 is larger than each of the detection ranges 51R, 52R of the foreign matter detection sensors 51, 52, and the maximum detection distance of the body sensor 41 is larger than the maximum detection distance of each of the foreign matter detection sensors 51, 52. According to the above, it is possible to detect the presence of a human at a position relatively long in distance from the enclosure 2 using the biological detection section 4, and in addition, it is possible to detect the presence of a foreign matter at a position relatively short in distance from the enclosure 2 using the foreign matter detection section 5. Therefore, it is possible to detect the presence of a human and a foreign matter different in distance from the enclosure 2 from each other. Further, for this reason, it is possible to detect the presence of a foreign matter disposed near the passage opening 214 using the foreign matter detection section 5, and it is possible to detect the presence of a human trying to peer into the passage opening 214 using the biological detection section 4. Therefore, it is possible to enhance the convenience of the projector 1.

The body sensor 41 is disposed so that the detection axis 41X extends along the projection direction of the light by the projection section 33.

According to such a configuration, it is possible to make it easy to detect the presence of a human located in the projection direction of the light by the projection section 33 using the biological detection section 4. Therefore, it is possible to make it easy to detect the presence of a human trying to peer into the passage opening 214 using the biological detection section 4.

The foreign matter detection section 5 has the plurality of foreign matter detection sensors 51, 52.

According to such a configuration, since the plurality of foreign matter detection sensors 51, 52 having the detection range smaller than the detection range 41R of the body sensor 41 is provided to the projector 1, it is possible to make it easy to detect the presence of a foreign matter.

Out of the plurality of foreign matter detection sensors 51, 52, the foreign matter detection sensor 51 is disposed in the same plane as the body sensor 41.

According to such a configuration, it is possible to make it easy to arrange the body sensor 41 and the foreign matter detection sensor 51 so that the detection axis 41X of the body sensor 41 and the detection axis 51X of the foreign matter detection sensor 51 point to substantially the same directions. Thus, in the directions to which the respective detection axes 41X, 51X point, the presence of a foreign matter located in a relatively short distance from the enclosure 2 can be detected by the foreign matter detection sensor 51, and the presence of a human located in a relatively long distance from the enclosure 2 can be detected by the body sensor 41. Therefore, it is possible to make it easy to detect the presence of a human and the presence of a foreign matter.

The direction of the detection axis 51X of the foreign matter detection sensor 51 is different from the direction of the detection axis 52X of the foreign matter detection sensor 52.

According to such a configuration, it is possible to make it easy to detect the presence of a foreign matter disposed in the vicinity of the enclosure 2.

The enclosure 2 has the passage opening 214 through which the light emitted from the projection section 33 passes. The body sensor 41 and the foreign matter detection sensor 51 are located in the opposite side to the emission side of the light by the projection section 33 with respect to the passage opening 214. The foreign matter detection sensor 52 is located at the opposite side to the foreign matter detection sensor 51 across the passage opening 214.

According to such a configuration, it is possible to make it easy to detect the presence of a foreign matter which covers at least a part of the passage opening 214 using the foreign matter detection sensor 51 and the foreign matter detection sensor 52.

The enclosure 2 is provided with the top surface part 21 as the first surface having the recessed part 211. The recessed part 211 has the first tilted part 212 in which the passage opening 214 is located, and which is tilted with respect to the top surface part 21, and the second tilted part 213 which is opposed to the first tilted part 212 and is tilted with respect to the first tilted part 212. The body sensor 41 and the foreign matter detection sensor 51 are located in the first tilted part 212. The foreign matter detection sensor 52 is located in the second tilted part 213.

According to such a configuration, it is possible to prevent the light projected from the projection section 33 via the passage opening 214 from being blocked by a part of the enclosure 2. Further, since the body sensor 41 is provided to the first tilted part 212, it is possible to make it easy to dispose the body sensor 41 so that the detection axis 41X extends along the projection direction of the light from the passage opening 214. Further, since the foreign matter detection sensor 51 is provided to the first tilted part 212, and the foreign matter detection sensor 52 is provided to the second tilted part 213, it is possible to make it easy to detect the presence of a foreign matter disposed in the vicinity of the passage opening 214.

The foreign matter detection sensors 51, 52 detect the presence of a foreign matter located near the passage opening 214.

According to such a configuration, it is possible to detect the presence of a foreign matter which is disposed so as to cover at least a part of the passage opening 214 using the foreign matter detection sensors 51, 52. Thus, it is possible, for example, for the notification section 7 to notify the user of the fact that the passage opening 214 is blocked, and thus, it is possible to enhance the general versatility of the projector 1.

The body sensor 41 is a pyroelectric sensor for detecting the presence of a human. The foreign matter detection sensors 51, 52 are each an infrared sensor for detecting the presence of a foreign matter other than a human.

According to such a configuration, it is possible to detect the presence of a human trying to peer into the projection light using the body sensor 41, and further, it is possible to detect the presence of a foreign matter in the vicinity of the enclosure 2 using the foreign matter detection sensors 51, 52. Further, it is possible to make it easy to detect the presence of a human using the body sensor 41 as the pyroelectric sensor, and it is possible to make it easy to detect the presence of a foreign matter using the foreign matter detection sensors 51, 52 as the infrared sensors.

Modifications of Embodiment

Although the present disclosure is hereinabove described based on the embodiment, the present disclosure is not limited to the embodiment described above. The present disclosure can be implemented in a variety of aspects within the scope or the spirit of the present disclosure, and the following modifications, for example, are also possible.

In the embodiment described above, it is assumed that the projector 1 is installed to the floor or the table to be used in the posture in which the bottom surface part 22 faces down in the vertical direction. However, this is not a limitation, and the projector 1 can be used in a posture in which, for example, the bottom surface part 22 faces up or a lateral side.

In the embodiment described above, it is assumed that the body sensor 41 as the first sensor and the foreign matter detection sensors 51, 52 as the second sensors are provided to the top surface part 21 in which the passage opening 214 is located Specifically, it is assumed that the body sensor 41 and the foreign matter detection sensor 51 are provided to the first tilted part 212 which faces to the screen SCR in the recessed part 211 located in the top surface part 21, and in which the passage opening 214 is located. Further, it is assumed that the foreign matter detection sensor 52 is provided to the second tilted part 213 opposed to the first tilted part 212 in the recessed part 211. However, this is not a limitation, and when the passage opening 214 is provided to the side surface part opposed to the projection target surface out of the side surface parts coupling the top surface part 21 and the bottom surface part 22 to each other, the first sensor and the second sensors can be provided to the side surface part opposed to the projection target surface. In other words, the present disclosure can be applied not only to the short focus projector, but also to other types of projectors such as a so-called front-projection type projector.

Further, the first sensor and the second sensors can be provided to a surface different from the surface in which the passage opening 214 is located in the enclosure 2. Further, the first sensor and the second sensors can be provided to the respective surfaces different from each other in the enclosure 2.

In the embodiment described above, it is assumed that the body sensor 41 as the first sensor detects the presence of a human as the first object in the outside of the enclosure 2, and the foreign matter detection sensors 51, 52 as the second sensors detect the presence of a foreign matter as the second object in the outside of the enclosure 2. However, this is not a limitation, and the detection object of the first sensor provided to the first detection section is not required to be the presence of a human, and the detection object of the second sensors provided to the second detection section is not required to be the presence of a foreign matter.

In the embodiment described above, it is assumed that the body sensor 41 as the first sensor is disposed so that the detection axis 41X extends along the projection direction of the light by the projection section 33. However, this is not a limitation, and the first sensor can be arranged so as to be able to detect the presence of the first object in a direction different from the projection direction.

In the embodiment described above, it is assumed that the plurality of foreign matter detection sensors as the second sensors is provided to the projector 1. Specifically, it is assumed that the foreign matter detection section 5 as the second detection section provided to the projector 1 has the two foreign matter detection sensors 51, 52. However, this is not a limitation, and it is possible for the second detection section to be provided with a configuration having a single second sensor, or a configuration having three or more second sensors. Similarly, it is assumed that the biological detection section 4 as the first detection section has the single body sensor 41, but this is not a limitation, and the number of the first sensors provided to the first detection section can be two or more.

In the embodiment described above, it is assumed that the direction of the detection axis 51X of the foreign matter detection sensor 51 as the second sensor and the direction of the detection axis 52X of the foreign matter detection sensor 52 as the second sensor are different from each other. However, this is not a limitation, and when, for example, the foreign matter detection sensors 51, 52 are disposed at the positions across the passage opening 21A in the +X direction, it is possible for the detection axes 51X, 52X to point in the same direction. In other words, it is possible for the plurality of second sensors to be provided to the projector so that the directions in which the detection axes point are the same.

In the embodiment described above, it is assumed that the foreign matter detection sensors 51, 52 as the second sensors are disposed at the positions across the passage opening 214. However, this is not a limitation, and when the foreign matter detection sensors 51, 52 are different in detection object from each other, or the like, the foreign matter detection sensors 51, 52 are not necessarily required to be disposed at the positions across the passage opening 214. In other words, the arrangement positions and the number of the second sensors are not particularly limited.

In the embodiment described above, it is assumed that the enclosure 2 has the recessed part 211 in the top surface part 21, the passage opening 214, the body sensor 41 and the foreign matter detection sensor 51 are provided to the first tilted part 212 constituting the recessed part 211, and the foreign matter detection sensor 52 is provided to the second tilted part 213 which constitutes the recessed part 211, and is tilted with respect to the first tilted part 212. However, this is not a limitation, and the enclosure 2 is not required to be provided with the recessed part. Further, the body sensor 41 as the first sensor is not necessarily required to be provided to the first tilted part 212, and can be disposed in, for example, the top surface part 21 except the recessed part 211. The same applied to the foreign matter detection sensors 51, 52 as the second sensors.

Further, it is possible for the foreign matter detection sensors 51, 52 to be disposed in the first tilted part 212 so as to be, for example, across the passage opening 214 in the +X direction.

In the embodiment described above, it is assumed that the body sensor 41 as the first sensor is the pyroelectric sensor for detecting the presence of a human, and the foreign matter detection sensors 51, 52 as the second sensors are each the infrared sensor for detecting the presence of a foreign matter as an object other than a human. However, this is not a limitation, and the body sensor 41 can be what detects the presence of a human with a different method, and the foreign matter detection sensors 51, 52 can be what detects the presence of a foreign matter with a different method.

In the embodiment described above, it is assumed that the control section 6 puts the illumination section 31 off, and in addition, the notification section 7 notifies the user of the fact that a human or a foreign matter has been detected when at least one of the biological detection section 4 and the foreign matter detection section 5 has detected the presence of the human or the foreign matter. However, this is not a limitation, and it is possible for the control section 6 to reduce the amount of the light emitted by the illumination section 31 when the human or the foreign matter has been detected. Further, when the projector 1 is not provided with the notification section 7, the notification by the notification section 7 is not required to be performed. It should be noted that the aspect of the notification by the notification section 7 is not limited to the notification with the indicator as described above.

In the embodiment described above, it is assumed that the projector 1 projects an image to the screen SCR as the projection target surface. However, this is not a limitation, and in the usage of the projector 1, the screen SCR is not an essential constituent. For example, it is possible for the projector 1 to be used in an aspect of projecting an image to an indoor wall or a building.

Conclusion of Present Disclosure

Hereinafter, the conclusion of the present disclosure will additionally be described.

The projector according to an aspect of the present disclosure includes an illumination section configured to emit light, a light modulation section configured to modulate the light from the illumination section in accordance with image information, a projection section configured to project the light from the light modulation section, an enclosure configured to house the illumination section, the light modulation section, and the projection section, a first detection section which has a first sensor provided to the enclosure, and is configured to detect a presence of a first object in an outside of the enclosure, and a second detection section which has a second sensor provided to the enclosure, and is configured to detect a presence of a second object different from the first object in the outside of the enclosure, wherein when defining a central axis of a first detection range, which is a detection range of the first sensor, as a first detection axis, and a central axis of a second detection range, which is a detection range of the second sensor, as a second detection axis, a distance from an end part in a direction along the first detection axis in the first detection range to the first sensor is longer than a distance from an end part in a direction along the second detection axis in the second detection range to the second sensor.

According to such a configuration, the detection range of the first sensor is larger than the detection range of the second sensor. In other words, the detectable distance for the first object by the first sensor is longer than the detectable distance for the second object by the second sensor. According to the above, it is possible to detect the presence of the first object at a position relatively long in distance from the enclosure using the first detection section, and in addition, it is possible to detect the presence of the second object at a position relatively short in distance from the enclosure using the second detection section. Therefore, it is possible to detect the presence of the first object and the second object different in distance from the enclosure from each other. Further, for example, the presence of a foreign matter disposed in a region through which the light projected by the projection section passes in the chasses part can be detected as the second object by the second detection section. Further, for example, the presence of a human trying to peer into the region through which the light passes in the chasses part can be detected as the first object by the first detection section. Therefore, it is possible to enhance the convenience of the projector.

In the aspect described above, the first sensor may be disposed so that the first detection axis extends along a projection direction of the light by the projection section.

According to such a configuration, it is possible to make it easy to detect the presence of the first object located in the projection direction of the light by the projection section using the first detection section. Therefore, for example, when the first object is a human, it is possible to make it easy to detect the presence of the human trying to peer into the region through which the light projected by the projection section passes in the chasses part by the first detection section.

In the aspect described above, the second detection section may have a plurality of the second sensors.

According to such a configuration, since the plurality of second sensors each having the detection range smaller than the detection range of the first sensor is provided to the projector, it is possible to make it easy to detect the presence of the second object.

In the aspect described above, at least one of the second sensors may be disposed in a same plane as the first sensor.

According to such a configuration, it is possible to make it easy to dispose the first sensor and the at least one of the second sensors so that the first detection axis of the first sensor and the second detection axis of the at least one of the second sensors point in substantially the same directions. Thus, in the directions in which the respective detection axes point, the presence of second object located in a relatively short distance from the enclosure can be detected by the second sensor, and the presence of the first object located in a relatively long distance from the enclosure can be detected by the first sensor.

Therefore, it is possible to make it easy to detect the presence of the first object and the second object.

In the aspect described above, a direction of the second detection axis of the at least one of the second sensors may be different from a direction of the second detection axis of another of the second sensors.

According to such a configuration, it is possible to make it easy to detect the presence of the second object disposed in the vicinity of the enclosure.

In the aspect described above, the enclosure may have a passage opening through which the light emitted from the projection section passes, the first sensor and the at least one of the second sensors may be located on an opposite side to an emission side of the light by the projection section with respect to the passage opening, and the another of the second sensors may be located on an opposite side to the at least one of the second sensors across the passage opening.

According to such a configuration, it is possible to make it easy to detect the presence of the second object which covers at least a part of the passage opening by the at least one of the second sensors and the another of the second sensors.

In the aspect described above, the enclosure may have a first surface having a recessed part, the recessed part may include a first tilted part in which the passage opening is located, and which is tilted with respect to the first surface, and a second tilted part which is opposed to the first tilted part, and is tilted with respect to the first tilted part, the first sensor and the at least one of the second sensors may be located in the first tilted part, and the another of the second sensors may be located in the second tilted part.

According to such a configuration, since the enclosure has the recessed part having the first tilted part in which the passage opening is located, and the second tilted part which is opposed to the first tilted part, and is tilted with respect to the first tilted part, it is possible to prevent the light emitted through the passage opening from being blocked by a part of the enclosure. Further, since the first sensor is disposed in the first tilted part, it is possible to make it easy to dispose the first sensor so that the detection axis of the first sensor extends along the proceeding direction of the light from the passage opening. Further, since the second sensors are disposed in the first tilted part and the second tilted part, it is possible to make it easy to detect the presence of the second object disposed in the vicinity of the passage opening.

In the aspect described above, the second sensors may detect a presence of a foreign matter located near the passage opening.

According to such a configuration, it is possible to detect the presence of a foreign matter which is disposed so as to cover at least a part of the passage opening using the second sensors. Thus, when, for example, the projector has a notification device, it is possible to notify the user of the fact that the passage opening is blocked, and thus, it is possible to enhance the general versatility of the projector.

In the aspect described above, the first sensor may be a pyroelectric sensor configured to detect a presence of a human as the first object, and the second sensors may each be an infrared sensor configured to detect a presence of a foreign matter as the second object other than a human.

According to such a configuration, it is possible to detect the presence of a human trying to peer into the projected light using the first sensor, and further, it is possible to detect the presence of a foreign matter disposed in the vicinity of the enclosure using the second sensors. Further, it is possible to make it easy to detect the presence of a human using the first sensor as the pyroelectric sensor, and it is possible to make it easy to detect the presence of a foreign matter using the second sensors as the infrared sensors.

What is claimed is:

1. A projector comprising:
   an illumination section configured to emit light;
   a light modulation section configured to modulate the light from the illumination section in accordance with image information;
   a projection section configured to project the light from the light modulation section;
   an enclosure configured to house the illumination section, the light modulation section, and the projection section;
   a first detection section which has a first sensor provided to the enclosure, and has a first detection axis as a central axis of a first detection range as a detection range of the first sensor; and
   a second detection section which has a second sensor provided to the enclosure, and has a second detection axis as a central axis of a second detection range as a detection range of the second sensor, wherein
   a distance of the first detection range from the first sensor in the first detection axis of the first detection section is longer than a distance of the second detection range from the second sensor in the second detection axis of the second detection section.

2. The projector according to claim 1, wherein
   the first sensor is disposed so that the first detection axis extends along a projection direction of the light by the projection section.

3. The projector according to claim 1, wherein
   the detection range of the first sensor is set to be outside a projection range by the projection section.

4. The projector according to claim 3, wherein
   the detection range of the second sensor is set to be outside the projection range by the projection section, and outside the detection range of the first sensor.

5. The projector according to claim 1, wherein
   the enclosure has a passage opening through which the light emitted from the projection section passes,
   the second detection section has a plurality of the second sensors, and
   the plurality of second sensors is disposed around the passage opening.

6. The projector according to claim 5, wherein
   a direction of the second detection axis of one of the second sensors is different from a direction of the second detection axis of another of the second sensors.

7. The projector according to claim 5, wherein
one of the second sensors is located on an opposite side to another of the second sensors across the passage opening.

8. The projector according to claim 7, wherein
the enclosure has a first surface having a recessed part,
the recessed part includes
    a first tilted part in which the passage opening is located, and which is tilted with respect to the first surface, and
    a second tilted part which is opposed to the first tilted part, and is tilted with respect to the first tilted part,
the first sensor and the one of the second sensors are located in the first tilted part, and
the another of the second sensors is located in the second tilted part.

9. The projector according to claim 1, wherein
the first sensor is a sensor configured to detect a presence of a human, and
the second sensor is a sensor configured to detect a presence of a foreign matter located near the passage opening.

10. The projector according to claim 1, wherein
the first sensor is a pyroelectric sensor, and
the second sensor is an infrared sensor.

\* \* \* \* \*